United States Patent Office 3,282,406
Patented Nov. 1, 1966

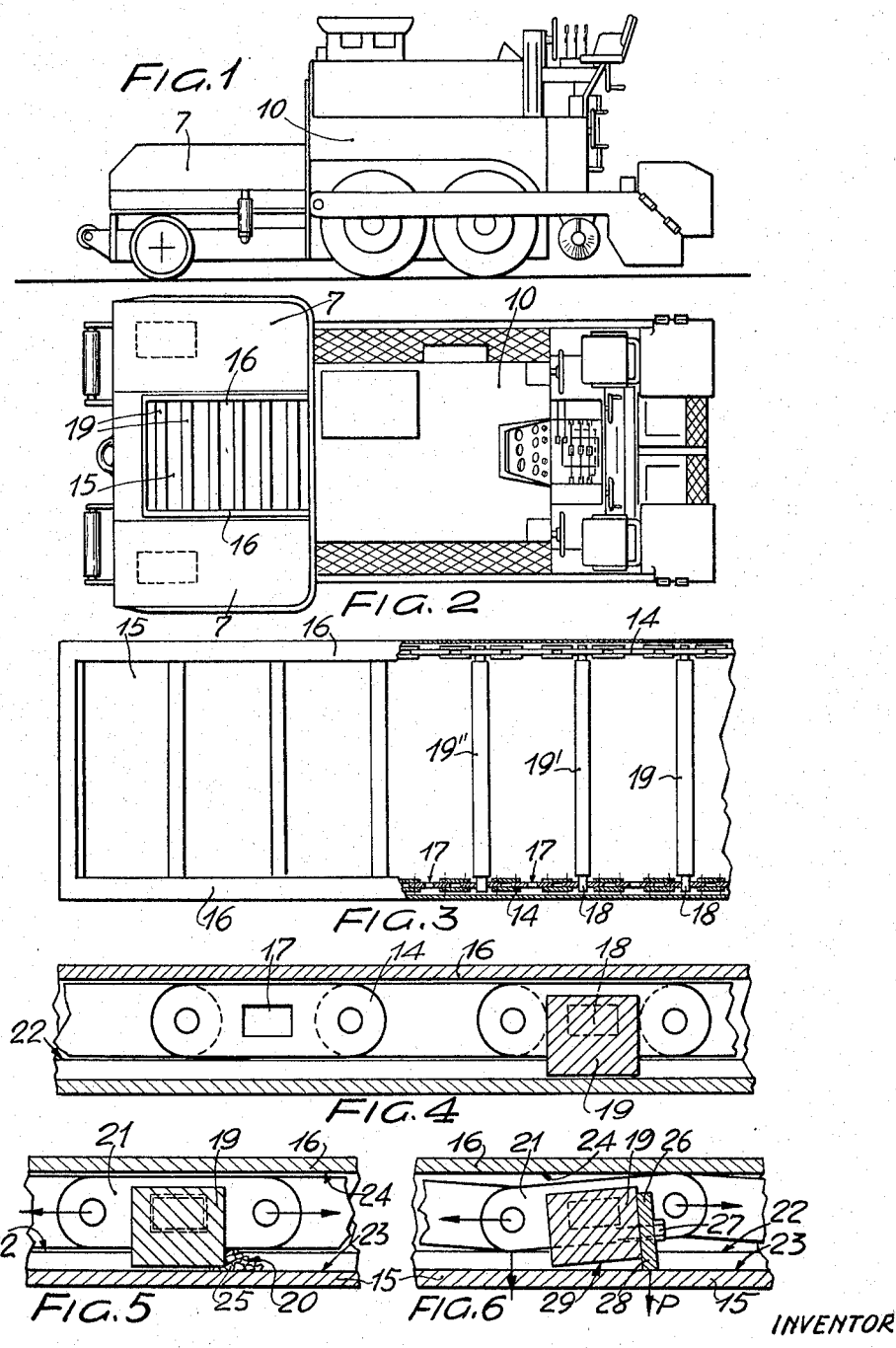

3,282,406
TRANSPORTING AND CONVEYING DEVICE FOR ROAD PAVING MACHINES SPREADING BITUMINOUS CONGLOMERATES
Domenico Domenighetti, Via Nosetto 6, Bellinzona, Switzerland
Filed May 25, 1964, Ser. No. 369,810
Claims priority, application Switzerland, Aug. 6, 1963, 9,798/63
4 Claims. (Cl. 198—174)

The present invention relates to an improved transporting and conveying device for road finishers spreading out bituminous conglomerates.

Conventional finishing machines have the hopper for the feeding of the conglomerate material to be spread on the road, provided with a bottom portion made of one or more conveying belts extending for about the whole length of the machine up to the back distributing screw. The function of this conveying belt is very important because it is responsible for the regular conveyance of the conglomerate material from the front part where it is loaded to the rear part of the machine where it is distributed on the road surface.

The conventional conveyors are generally formed with bars having an almost quadrangular section and being mounted on two parallel endless chains rotating while sliding for a given section on a base surface made of a a plate which has the bars dragged thereon. A good operation of the conveyor is often prevented by the fact that the conglomerate granules have the tendency of entering between the lower edge of the bar and the plate, the bar is dragged on, thereby hindering the regular forward movement of said bar and of partially getting crushed so that they finally cause the complete jamming of the conveyor.

The present invention relates to an improved conveying device, characterized in that each bar, the conveying element is formed with, has its front face, i.e., the face which is turned toward the feeding direction, provided with a steel sheet fixed to said bar and projecting therefrom in its lower portion, so that the bar is inclined upwards with its front edge lifted, the steel sheet scraping as a blade the slide surface underneath, thereby keeping it clear and preventing the bituminous conglomerate granules from entering between the bar and the plate, it slides on.

The accompanying drawing diagrammatically shows by way of example only an embodiment of the invention.

In the drawing:

FIGS. 1 and 2 respectively are a side elevation and a plan view of a vibro-finishing machine for spreading bituminous conglomerates having the device of the invention mounted thereon.

FIG. 3 and 4 are an enlarged scale plan view an a longitudinal section of a conventional conveying belt.

FIG. 5 is a sectional lateral view illustrating how the conglomerate granules get to jam the conventional type belt conveyors during operation.

FIG. 6 is an enlarged scale sectional side view of the device according to the invention.

The conventional conveying belts are built as shown in the FIGS. 3, 4 and 5 and comprise a pair of chains 14 which wind up and are actuated by means of non-represented gears. These chains slide on a base plate 15 and are held in position by two plate guides 16 which are fixed together with the plate 15 to the main frame 10 of the machine.

The hingedly connected chain links are so constructed as to have each an eyelet 17 which may receive therein the stem 18 of a quadrangular section bar 19.

Because of the symmetrical arrangement of the two chains 14, a bar 19 having both its stems 18 engaged into the eyelets 17 of two corresponding and reciprocally facing links of the two parallel chains, moves, in virtue of the uniform and identical motion of both chains, parallelly to itself. Thus, a plurality of equidistant also parallelly moving bars 19, 19', 19'' and so on, causes the feeding of the conglomerate material which a truck has previously discharged into the hopper 7.

FIG. 5 clearly shows the cross section of the bar 19 as connected to the chain link 21 sliding along the guide face 22. The bar 19 slides on the surface 23 of the plate 15. The link 21 is guided in its movement by the plate portion 16, which contacts same with the slide plane 24. During operation the bar 19 is invested by the mass of material (i.e. bituminous conglomerate) which is poured thereon from the truck. The chains 14, on the contrary, do not come into contact with the material since they are protected by the side plate portions 16. In its forward motion causing the forward feeding of the material the bar 19 encounters the obstacle provided by the bituminous conglomerate granules. The major obstacle is provided by those granules which are about in the position 20 (FIG. 5) because they have the tendency of entering between the bar 19 and its sliding plane 23. When a granule has entered position 25 the bar 19 moves up a little bit in virtue of its elasticity and of the elasticity of plate portion 16. Other granules are thus able to enter into the slot and are successively crushed therein, thereby hindering the forward movement of the bar and being responsible for breakage, damages of the device and so on.

The situation gets particularly critical when the bituminous conglomerates, it has to be worked with, have a little, if any, bitumen content, at all what is very often the case in modern road paving construction works.

Because of the lacking of the lubricating action of the bitumen the above mentioned phenomenon tends to grow thereby causing several break-downs and damages.

The device according to the present invention eliminates the above mentioned disadvantages by having a steel scraper sheet 26 (FIG. 6) applied to each bar 19 by means of screws or bolts 27 or simply welded thereto but disposed in such a manner as to have a projection 28 extend beyond the bottom surface 29 of the bar 19.

The length of the projection 28 will be so chosen as to have the lower edge of the sheet 26 exert a stress against the slide plane 23 and thereby to tilt one longitudinally terminal portion of the chain link 21 into engagement with the upper slide plane 24 and away from the guide plane 22.

The tilting angle which may be easily controlled by suitably choosing the amount of which the projection 28 extends from the surface 29, ensures that the steel sheet 26 always positively presses against the slide plane 23, thereby preventing material granules from entering underneath the bar 19 and causing the slide plane 23 and the lower edge of sheet portion 26 causes a progressive sharpening of said sheet portion 26 so that the lower front edge of same 26 always conforms to the slide plane 23 to prevent even the smallest material granules from entering underneath the bar 19. Should the sheet 26 be mounted on the bar 19 by means of screws or bolts 27, said sheet 26 would be provided with elongated openings consenting to reset projection 28 each time when, the lower edge of sheet means 26 having been worn out, the length of said projection 28 has been excessively reduced.

The adhesion of sheet means 26 to the slide plane 23 of plate 15 is also provided by the weight of the bars 19 which are in an inclined and, in the front part, lifted position.

In the case of the chain links 21 as well, the friction surface against the upper guiding plate portion 16 is decreased in view of the fact that said links are in inclined position. The tension, the chains 14 are subjected to, consents to adjust the pressure P of the scraping sheet portion 26 on the lower plane 15 of the conveying device.

The constructive details of the bar and of the sheet portions as well as the fastening systems of the sheet portion to the bar may obviously be varied at will without therefore departing from the spirit of the present invention.

What is claimed is:

1. A conveyor arrangement for a road paving machine and the like comprising, in combination:
   (a) a base plate having a normally upwardly directed horizontally extending face;
   (b) two elongated chains, each chain including a plurality of hingedly connected links, each link having two terminal portions spaced in the direction of chain elongation;
   (c) guide means secured to said plate for guiding movement of said chains in respective parallel, longitudinal, transversely spaced paths,
      (1) said guide means having two upwardly directed guide faces substantially parallel to said face of the base plate and upwardly spaced therefrom,
      (2) each chain engaging a respective guide face;
   (d) a plurality of bars spaced longitudinally of said paths and having respective longitudinal axes transverse of said paths,
      (1) each bar having a pair of axial end portions fixedly secured to links of said chains respectively,
      (2) each bar having a bottom face directed toward said base plate;
   (e) a scraper sheet projecting from a portion of said bar spaced from the axis thereof in the direction of said paths beyond said bottom face into engagement with said base plate over a distance sufficient to tilt said bar about the axis thereof and thereby to lift one of the terminal portions of each associated link from the associated guide face while the other terminal portion engages said guide face during said movement of said chains.

2. An arrangement as set forth in claim 1, wherein said bottom face is held by said engagement of the scraper sheet with the base plate in a position in which a first portion of said bottom face near said scraper sheet is farther removed from said base plate than a second portion of said bottom face spaced from said first portion in the direction of said paths and remote from said scraper sheet.

3. An arrangement as set forth in claim 2, wherein said scraper sheet has a bottom face in conforming contact with said base plate, the width of the bottom face of said sheet in the direction of said paths being substantially smaller than the corresponding width of the bottom face of said bar.

4. An arrangement as set forth in claim 1, further comprising means fastening said scraper sheet to said bar for adjusting movement in a direction toward and away from said base plate.

References Cited by the Examiner
UNITED STATES PATENTS

| | | | |
|---|---|---|---|
| 2,575,610 | 11/1951 | Ball | 198—175 |
| 2,646,157 | 7/1953 | Belt | 198—172 |
| 2,815,116 | 12/1957 | Erickson | 197—172 |
| 3,139,174 | 6/1964 | Genter | 198—175 |

ANDRES H. NIELSEN, *Primary Examiner.*

RICHARD E. AEGERTER, *Examiner.*